United States Patent [19]

Marshall

[11] Patent Number: 5,141,690

[45] Date of Patent: Aug. 25, 1992

[54] METHOD FOR MANUFACTURING COMPOSITE MATERIAL

[75] Inventor: James G. Marshall, Bristol, England

[73] Assignee: The British Petroleum Company p.l.c., London, England

[21] Appl. No.: 644,136

[22] Filed: Jan. 22, 1991

Related U.S. Application Data

[62] Division of Ser. No. 480,403, Feb. 15, 1990, abandoned.

[30] Foreign Application Priority Data

Feb. 24, 1989 [GB] United Kingdom ............... 8904277

[51] Int. Cl.⁵ ............................................. B29C 67/14
[52] U.S. Cl. ................................. 264/154; 264/156; 264/257; 264/316; 264/324
[58] Field of Search .............. 264/257, 258, 154, 155, 264/156, 273, 324, 325, 313, 316

[56] References Cited

U.S. PATENT DOCUMENTS

| | | | |
|---|---|---|---|
| 3,028,284 | 4/1962 | Roeves | 156/213 |
| 3,787,546 | 1/1974 | Pratt et al. | 264/156 |
| 4,132,519 | 1/1979 | Reed | 425/290 |
| 4,160,055 | 7/1979 | Reed | 264/154 |
| 4,486,372 | 12/1984 | Hillard et al. | 264/156 |

FOREIGN PATENT DOCUMENTS

| | | |
|---|---|---|
| 3715409 | 10/1987 | Fed. Rep. of Germany. |
| WO86/03453 | 6/1986 | PCT Int'l Appl. |
| 2064412A | 6/1971 | United Kingdom. |
| 2025302A | 1/1980 | United Kingdom. |
| 2090183A | 7/1982 | United Kingdom. |
| 2168647 | 1/1986 | United Kingdom. |

*Primary Examiner*—Jay H. Woo
*Assistant Examiner*—Robert B. Davis
*Attorney, Agent, or Firm*—Larry W. Evans; Dave J. Untener; Sue E. Phillips

[57] ABSTRACT

A method and apparatus for manufacturing perforate, fiber reinforced composite material wherein the fiber reinforcing material is impregnated with the resin which is cured to give a strong light material.

9 Claims, 2 Drawing Sheets

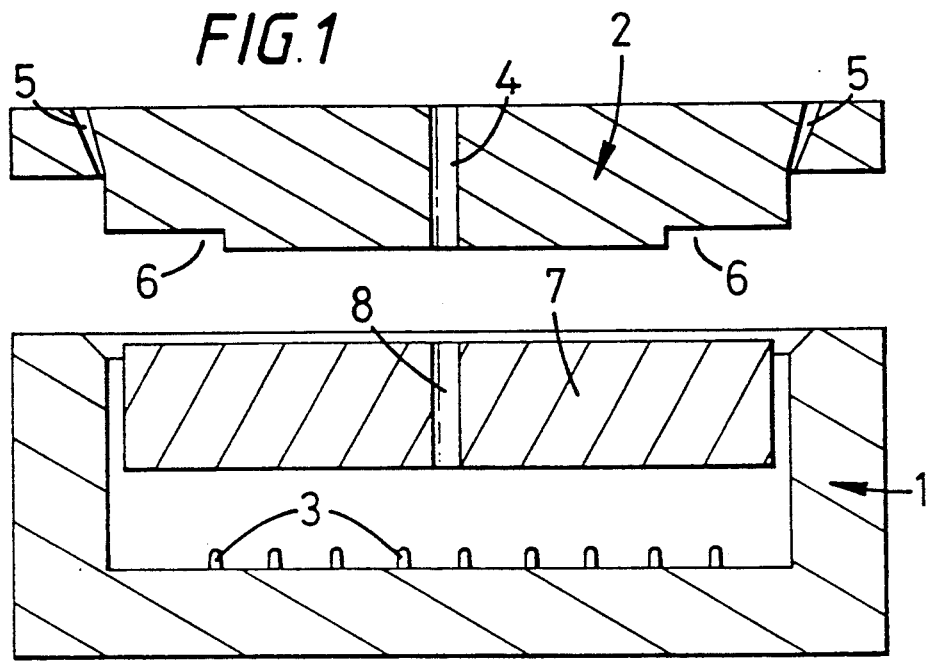
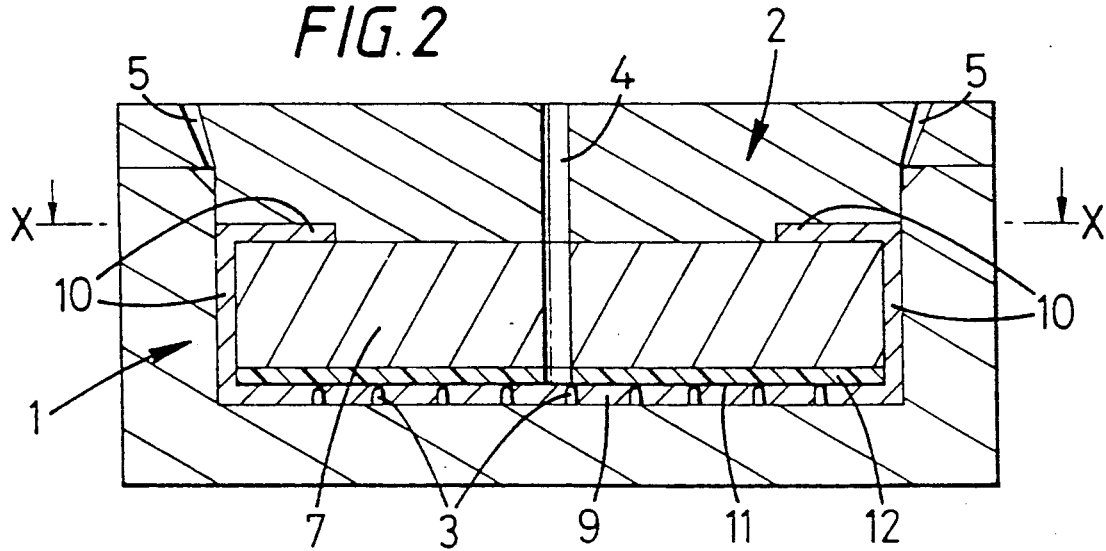

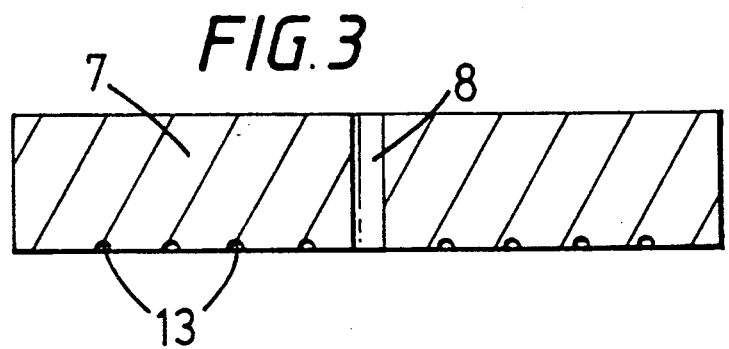
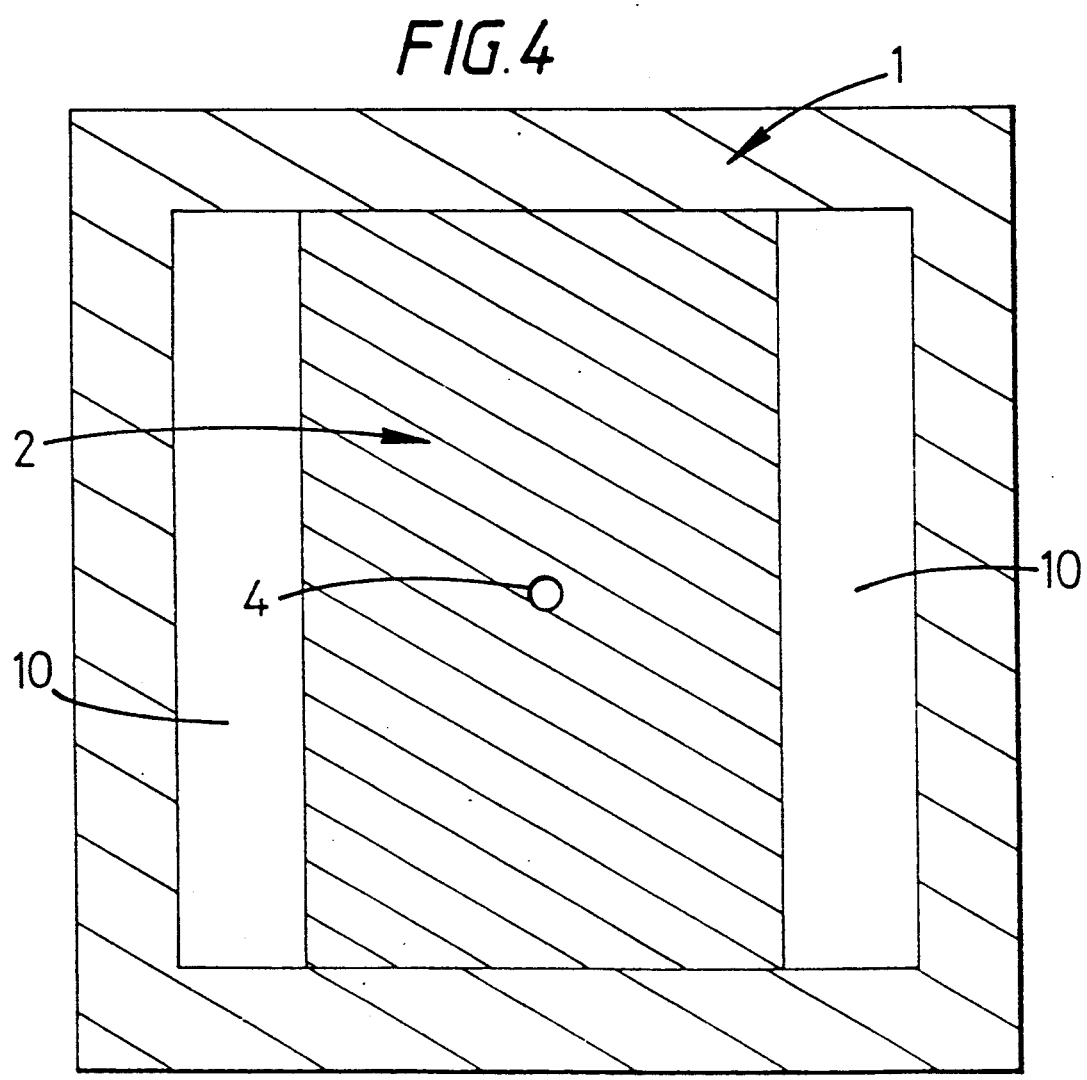

METHOD FOR MANUFACTURING COMPOSITE MATERIAL

This is a divisional of co-pending application Ser. No. 07/480,403, filed Feb. 15, 1990 now abandoned.

FIELD OF THE INVENTION

This invention relates to a method for manufacturing perforate, fiber-reinforced, composite material.

BACKGROUND OF THE INVENTION

Composite materials are known, wherein a fiber reinforcing material is impregnated with a resin which is cured to give a strong, lightweight material. Such materials are particularly suitable for structures where the low weight to strength ratio may be exploited, for example in aircraft structures.

Conventionally, some lightweight structures are made of lightweight metal alloys and in some of these structures one or more sheets of the structure are perforate to provide sound attenuation. Such perforate sheets are found, for example, on the face of blocker doors in jet engines. These perforate metal alloy sheets may be made by known techniques of casting and drilling or punching, and the like. Hitherto, the use of resin-impregnated fiber-reinforced composite materials would not have been thought applicable to the manufacture of such perforate sheets because, drilling or punching fiber-reinforced composite materials would have been expected to break the continuity of the fibers with loss of strength. Furthermore, such additional processing is time consuming.

If the perforations in the reinforcing fiber material are formed before it is impregnated and cured, by means of needles in a mold, the fibers of the reinforcing fiber material may be parted by the needles rather than being broken, thereby maintaining the continuity of the fibers. This results in a composite material with superior qualities.

A problem often associated with the manufacture of composite materials with intricate shapes, such as, for example, numerous perforations, is that the material is difficult to remove from the mold. A number of attempts have been made to solve this problem. For example, United Kingdom Patent Application No. GB2090183A relates to a method of manufacturing a perforate composite material wherein a former is melted to release the composite from the mold. Such processes may be very time consuming.

GB 2025302A describes a process in which a fibrous sheet is impregnated with liquid resin, and the sheet is then pierced with hot pins so that the resin around the pins is partially cured. The pins are then removed, and the sheet is fully cured by application of further heat.

SUMMARY OF THE INVENTION

According to the present invention there is provided a method for manufacturing perforate, fiber-reinforced, composite material the method comprising the steps:

(a) providing a mould comprising a first part having needles, a second part cooperating with the first part to close the mold, and an intermediate part located in use between the first and second parts;

(b) laying up reinforcing fibers in the first part of the mold, at least some of the fibers being longer than required for the finished composite material, the fibers if desired being impregnated or admixed with resin;

(c) positioning the intermediate part of the mold over the free ends of the needles, and folding the fibers of extra length around and over the intermediate part;

(d) assembling the rest of the mold;

(e) if required, injecting resin into the mold;

(f) curing the resin; and (g) dissassembling the mold, the composite material being removed from the needles along with the intermediate part.

DETAILED DESCRIPTION OF THE INVENTION

After curing of the resin, the fibers of extra length are set around and over the intermediate part, and accordingly the composite can be removed from the needles along with the intermediate part of the mold. The number of fibers folded around and over the intermediate part is not crucial, neither is the position of the folding. The fibers may be folded around and over one or more edges of the intermediate part or, for example, through a hole or holes in the part. Sufficient fibers must be used to provide a strong attachment to the intermediate part: insufficient fibers would be liable to break leaving the composite material stuck in the first part of the mold.

The intermediate part of the mold may be made of any material sufficiently strong to enable the part to be removed from the first part of the mold after curing of the resin, along with the composite material. Preferably the part is made of metal. After curing, it may be removed from the first part of the mold by any suitable means. It may for example be levered out, or pulled out by hooks or ropes fastened to suitable attachment means located on the intermediate part.

In order to produce a perforate composite, the needles must pass right through the material. Accordingly, the needles must, in the closed mould, meet an appropriate surface. This surface may be a surface, for example a metal or plastic surface, having indentations designed to cooperate with the ends of the needles. Alternatively and preferably, the surface may be of a resilient material such that when the needles press against the surface, indentations are formed. The intermediate part of the mold may present this surface directly, or a separate part may be introduced between the intermediate part and the needles. In a preferred embodiment of the invention, this further part is a separate sheet of resilient material, for example a resilient plastics material or latex or silicone rubber.

Whatever the surface presented to the needles, it may if desired be interfaced by a thin film of suitable plastics material, for example a nylon-based material. This film helps to prevent resin from clogging up holes formed around the ends of the needles and, when a silicone rubber surface is present, prevents silicone migration into the resin.

Once the composite material is removed from the mold, fibers of extra length can be trimmed away leaving a composite with the required dimensions.

When carrying out the process of the invention, the fibers may if desired already be impregnated with resin when laid up in the mold. Such resin may be liquid, or a powdered resin which may be melted prior to using. If desired, threads of thermoplastic resin may be present along with the reinforcing fibers. Such threads can be melted prior to using. Once the mold is closed, additional resin may be injected if required. Preferably, however, for ease of handling, the fibers are not impregnated with resin when laid up in the mould. All the resin is injected after closing of the mold.

The fibers laid up in the mold may be loose fibers, or they may be bonded together. Alternatively, they may be knitted or woven to form a cloth.

The fibers may be, for example, glass, carbon, Aramid, nylon and the like.

The resin may be any curable resin, for example, epoxy resin, bismaleimide resin, phenolic resin, polyester resin, vinyl ester resin, methacrylate resin, acrylate resin, polystyryl pyridine resin, and the like.

By curing it is intended to include known curing processes, for example heating in a controlled manner. It is also intended to include part-curing processes wherein the resin is only partly cured prior to removal from the mold; the resultant perforate fiber reinforced composite material then being further cured.

According to the present invention there is also provided a mold for manufacturing perforate, fiber-reinforced, composite material, the mold being capable of receiving reinforcing fiber material and resin to be molded into a fiber-reinforced, composite material, the mold comprising a first part having needles, a second part cooperating in use with the first part to close the mould, and an intermediate part located in use between the first and second parts; the arrangement being such that, in use, reinforcing fibers and resin may be laid up in the first part of the mold, at least some of the fibers being sufficiently long to fold around and over the intermediate part such that after curing of the resin, the finished composite material may be removed from the mold along with the intermediate part.

The needles may be made of nylon, metal or any suitable material which is capable of withstanding the process conditions, and may be of any suitable shape. Buckling of the needles when the mold is assembled is prevented by suitable design taking into account such factors as the stiffness of the needle, the required aspect ratio and the reinforcing fiber material density. Most preferably, the needles are tapered. The reinforcing fibers should be laid up around the needles in the first part part of the mold in such a way that the needles part the fibers without breaking them, thus producing a high-strength product.

According to the present invention there is also provided a perforate, fiber reinforced, composite material whenever manufactured by the method as herein before described.

It is envisaged that the perforate, fiber-reinforced, composite material of this invention may be used in applications requiring lightweight structures of high strength with sound attenuation properties, for example, face sheets of blocker doors. However, numerous other applications will be apparent and these may include, by way of example, sieve trays for distillation columns, sieves, panels for use in aircraft, ships and the like.

BRIEF DESCRIPTION OF THE DRAWINGS

The invention will be further described with reference to the accompanying drawings, in which:

FIG. 1 is a sectional view of an unassembled mold according to the invention;

FIG. 2 shows the use of the mold of FIG. 1 in the preparation of perforate composite material;

FIG. 3 shows an alternative form of an intermediate part for the mold of FIG. 1; and FIG. 4 is a section along X—X of FIG. 2.

The mold of FIG. 1 comprises a first part 1 forming the base of the mold and a second part 2 forming the top of the mould. The first part 1 is provided with a plurality of needles 3, while the second part 2 is provided with a port 4 for resin injection, vacuum ports 5 for removal of air, and cut-away portions 6. An intermediate part 7 has a port 8 for resin injection.

In use, the mold of FIG. 1 is assembled as shown in FIGS. 2 and 4. Fibres 9 are laid up in the first part 1 of the mold, around the needles 3. At least some of the fibers 9 are cut to have an extra portion 10 sufficient to wrap around and over the intermediate part 7. A thin nylon film 11 is laid over the top of the needles 3, and a sheet 12 of silicone rubber is laid over the nylon film 11. The mold is then assembled as shown, with the extra portions 10 of fibers 9 folded over the intermediate part 7 and located within cut-away portions 6 of the second part 2. Resin is injected through ports 4 and 8, and air is removed via vacuum ports 5. Once resin addition is complete, the resin is cured. After curing, the second part 2 of the mold is removed. The extra portions 10 of fibers 9 are now set with resin around the intermediate part 7. Intermediate part 7 is levered out of the mold, whereby the cured fibre-reinforced resin is pulled away from the needles 3. The excess length of material is trimmed away to leave the desired composite, in the case illustrated being a square of material having the dimensions of the base of the first part 1 of the mold.

Having operated the mold as shown in FIGS. 2 and 4, the nylon film is discarded. The silicone rubber sheet 12 may be re-used.

FIG. 3 shows an alternative embodiment of the intermediate part 7 of the mold of FIG. 1. The lower surface is provided with a plurality of indentations 13 designed to cooperate with the needles 3. When a mold containing such an intermediate part is assembled, the silicone rubber sheet 12 of FIG. 2 may be dispensed with. It is, however, desirable to retain the nylon film 10, to avoid clogging the indentations 13 with resin.

I claim:

1. A method for manufacturing perforate, fiber reinforced composite material, the method comprising the steps:
   (a) providing a mold comprising a first part having needles, said needles having a free end, a second part cooperating with the first part to close the mold, and an intermediate part located in use between the first and second parts;
   (b) laying up reinforcing fibers in the first part of the mold such that the needles separate the fibers, at least some of the fibers being longer than required for the finished composite material, the fibers being impregnated or admixed with resin;
   (c) positioning the intermediate part of the mold over the free ends of the needles, and folding the fibers being longer than required for the finished composite material around and over the intermediate part;
   (d) assembling the mold;
   (e) at least partly curing the resin; and
   (f) disassembling the mold, the composite material being removed from the needles along the intermediate part.

2. A method as claimed in claim 1 in which resin is injected into the mold prior to curing.

3. A method as claimed in claim 2 in which the mold includes a resilient surface such that when the mold is closed the needles meet and apply pressure against the resilient surface.

4. A method as claimed in claim 3, in which the resilient surface and the needles are interfaced by a thin film of plastics material.

5. A method as claimed in claim 1 in which the mold includes a resilient surface comprising a separate sheet of resilient material.

6. A method for manufacturing perforate, fiber reinforced composite material the method comprising the steps of:
   (a) providing a mold comprising a first part having needles, said needles having a free end, a second part cooperating with the first part to close the mold, and an intermediate part located in use between the first and second parts;
   (b) laying up reinforcing fibers in the first part of the mold such that the needles separate the fibers, at least some of the fibers being longer than required for the finished composite material;
   (c) positioning the intermediate part of the mold over the free ends of the needles, and folding the fibers being longer than required for the finished composite material around and over the intermediate part;
   (d) assembling the mold;
   (e) injecting resin into the mold;
   (f) at least partly curing the resin, and
   (g) dissassembling the mold, the composite material being removed from the needles along with the intermediate part.

7. A method as claimed in claim 6 in which the first part accommodates a resilient surface such that when the mold is closed the needles meet and press against the resilient surface, indentations are formed therein.

8. A method as claimed in claim 7 in which the resilient surface is a separate sheet of resilient material.

9. A method as claimed in claim 7 in which the resilient surface and the needles are interfaced by a thin film of plastics material.

* * * * *